United States Patent [19]
Agrawal et al.

[11] Patent Number: 6,044,448
[45] Date of Patent: Mar. 28, 2000

[54] PROCESSOR HAVING MULTIPLE DATAPATH INSTANCES

[75] Inventors: Nitin Agrawal; Sunil Nanda, both of Bangalore, India

[73] Assignee: S3 Incorporated, Santa Clara, Calif.

[21] Appl. No.: 08/991,392

[22] Filed: Dec. 16, 1997

[51] Int. Cl.⁷ .................................................. G06F 15/00
[52] U.S. Cl. .............................................................. 712/9
[58] Field of Search .......................... 395/800.22–820.24, 395/800.09; 345/505, 506; 712/22–24, 9

[56] References Cited

U.S. PATENT DOCUMENTS 5,333,280  7/1994  Ishikawa et al. ......................... 395/375

OTHER PUBLICATIONS

Alexandridis, "Bit–Sliced Microprocessor Architecture," IEEE, pp. 69–92, 1978.
Hayes, Computer Architecture and Organization, McGraw Hill, pp. 259–265, 1988.
PowerPC 603, RISC Microprocessor User's Manual, pp. 3–17 to 3–18, 1994.

*Primary Examiner*—John A. Follansbee
*Attorney, Agent, or Firm*—Fenwick & West LLP

[57] ABSTRACT

A processor having a sliceable architecture wherein a slice is the minimum configuration of the processor datapath. The processor can instantiate multiple slices and each slice has a separate datapath. The total processor datapath is the sum of the number of slices multiplied by the width of a slice. Accordingly, all general purpose registers in the processor are as wide as the total datapath. A program executing on the processor can determine the maximum number of slices available in a particular processor by reading a register. In addition, a program can select the number of slices it will use by writing to a different register. The processor replicates control signals for each active slice in the processor and supports instructions for transferring data among the slices. Furthermore, the processor supports a set of instructions for fetching and storing data between multiple slices and the memory. The effective addresses of the fetch and store instructions can either be aligned or misaligned with respect to slice boundaries and doubleword boundaries in the memory.

23 Claims, 4 Drawing Sheets

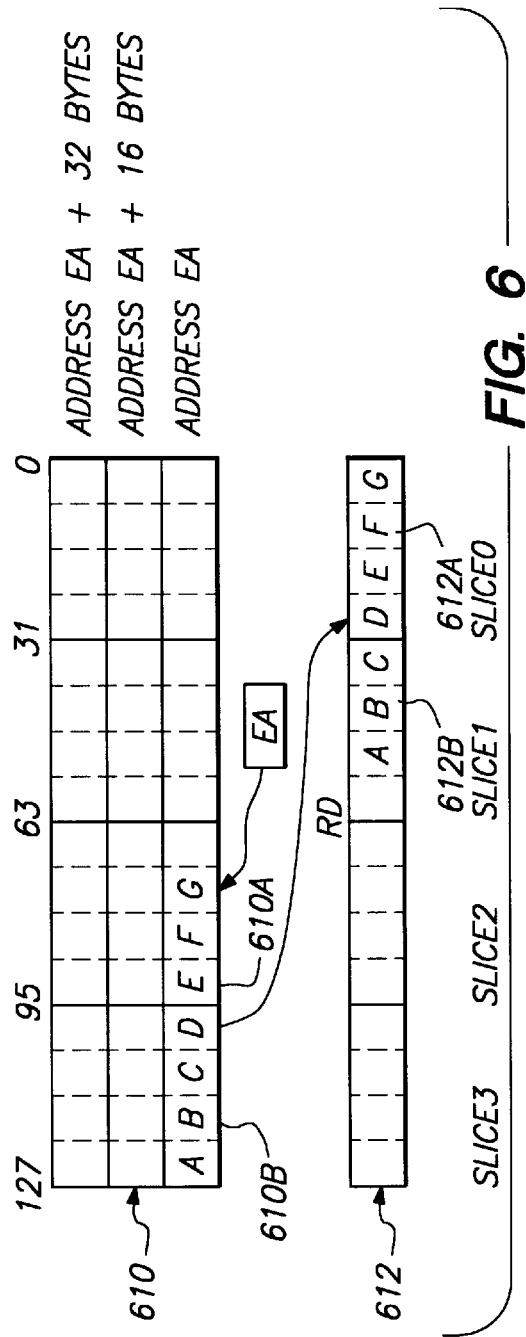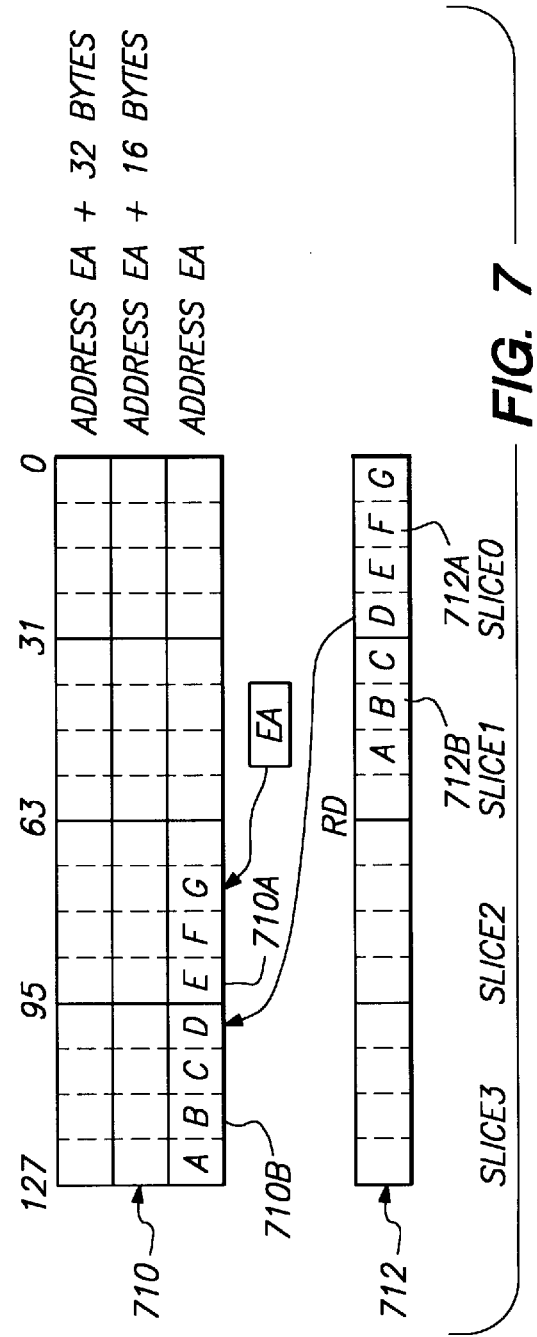

PROCESSOR HAVING MULTIPLE DATAPATH INSTANCES

BACKGROUND OF THE INVENTION

1. Field of the Invention

This invention pertains in general to a processor architecture and in particular to a processor architecture adapted to perform data-level parallelism.

2. Description of Background Art

Processor architectures have certain mechanisms for exploiting data- and instruction-level parallelism in order to scale processor performance. In short, data-level parallelism occurs when a single processor instruction performs simultaneous operations on multiple data. Instruction-level parallelism, in contrast, occurs when the processor simultaneously executes more than one instruction. These mechanisms have the disadvantage of requiring complex hardware and software for extending processor performance. In addition, the mechanisms generally concentrate more on the instruction level than the data level. Many media operations, however, including those that perform frequency impulse response, discrete cosine transforms, motion estimation, and motion compensation, require substantial amounts of data-level parallelism.

Single-instruction-multiple-data (SIMD) processor instructions can be used to exploit data-level parallelism. A single SIMD instruction operates on multiple data simultaneously. Typical processors have 32- or 64-bit datapaths while typical media operations operate on data requiring only 8- to 16-bit precision. Accordingly, some processors support SIMD through instruction set extensions and datapaths that simultaneously operate on 2 to 4 packed words.

Thus, a certain amount of data-level parallelism can be gained through the use of SIMD extensions to processor instruction sets. These extensions, however, are very hardware intensive. In addition, exploiting the SIMD architecture requires aggressive and complex assembly coding techniques to achieve the data-level parallelism and manage the resulting convoluted memory hierarchies and instruction scheduling requirements. Accordingly, the SIMD extensions cannot be used in the normal high-level language flow of program development because the data parallelism must be coded at a low level. Also, the functionality of the SIMD extensions is controlled by the width of the existing processor datapaths and programming models.

Processors supporting superscalar instruction scheduling exercise parallel functional units by dynamically extracting instruction-level parallelism from the instruction stream. When combined with SIMD data-level parallelism, superscalar processors can perform control flow operations in the instruction stream in parallel. Although these parallel operations can give very high performance, the processors must have very complex hardware. Moreover, such parallelism makes certain assumptions about the temporal and spatial locality of data that do not hold true when processing media data, thus reducing the effectiveness of these techniques in media applications. Finally, a programmer must use very complex programming techniques in order to fully utilize the hardware.

Processors supporting very long instruction word (VLIW) formats explicitly encode instruction parallelism into a very long instruction word. Basically, the VLIW format moves the complexity of extracting instruction-level parallelism from hardware to software. Thus, the use of a VLIW format makes the already complex task of coding data-level parallelism even harder. Another disadvantage of VLIW formats is that code must often be rewritten to support newer versions of the processors.

Accordingly, there is a need for a processor architecture that supports data-level parallelism in order to efficiently execute media operations. Such a processor should also include single scalar processor control to maintain simplicity in both hardware and software.

SUMMARY OF THE INVENTION

The above needs are met by a processor having an architecture capable of dividing its total datapath into multiple instances, or "slices." The processor comprises one or more slices, core logic, and a data transfer unit. In addition, the processor includes two special registers that allow programs to utilize the sliceable architecture and is preferably coupled to a monolithic main memory.

The first register is a read-only version register that indicates the total number of slices available in that particular implementation of the processor. A programmer can read the value in this register and then alter program behavior in response. Accordingly, the register provides the programmer with a mechanism for determining at run time the amount of data-level parallelism that can be extracted from the particular processor implementation.

The second register is a Kernel Processor Status Register (KPSR) that controls the number of slices a program uses. The processor uses $2^N$ slices, where N is the value stored in the KPSR. Thus, the programmer can use fewer than the total number of slices by storing a value indicating less than the total in the KPSR.

Each slice in the processor includes a register file and an arithmetic logic unit (ALU). The register file is preferably comprised of 32 32-bit wide registers. The register file of each slice is preferably a logically divided segment of a single register file having registers as wide as the total processor datapath. The ALU receives operands from the register and outputs a result to the register file.

The processor core logic comprises an instruction memory and an instruction decoder. The instruction memory holds program instructions and provides selected instructions to the instruction decoder. The instruction decoder decodes the received instruction and generates register indices and control signals therefrom. The register indices are sent to the register file of each slice. The control signals are replicated and sent to the controlled processor functional units, including the register files, the ALUs, and the data transfer unit, therefore making the total width of the datapath transparent to computational single-instruction-multiple-data (SIMD) instructions passing through the instruction decoder.

The data transfer unit receives an output from the register file of each slice and operates under the control of the instruction decoder to transfer data between the slices. The data transfer unit reads data from a register file of a first slice and writes the data to a register file in a second slice.

The instruction set executed by the processor has an underlying SIMD nature that allows programs to exploit data-level parallelism while maintaining a simple programming model. The instruction set supports several instructions for transferring data among the slices. The shlslice instruction moves register contents from slice m to slice m+1 while the shrslice instruction moves register contents from slice m to slice m−1. The shim instruction moves a variable amount of up to 31 bits of register content from a slice to the next higher slice while the shrm instruction moves a variable amount of up to 31 bits of register content from a slice to the next lower slice.

The instruction set also supports instructions for loading data from and storing data to memory. Two instructions, ldm and stm, are used to respectively load and store data having an effective address aligned on a double word * number of slices used=NSUSE boundary. Other instructions, including ldmh, ldml, stmh, and stml, are used to load and store data having an effective address (EA) not aligned on such a double word NSUSE boundary. The ldmh instruction fetches all bytes from the boundary one less than that of the EA to the EA from memory and loads the bytes in a register such that the byte at the EA is at the most significant byte position of slice $2^{NSUSE}-1$. The rest of the fetched bytes are loaded down towards slice 0. The stmh instruction loads memory positions from the boundary one less than that of the destination EA with bytes from a register such that the byte at the destination EA is filled with the byte at the most significant byte position of slice $2^{NSUSE}-1$. The ldml instruction fetches all bytes from the boundary one greater than that of the EA to the EA from memory and loads the bytes in a register such that the byte at the EA is at the least significant byte position of slice 0. The rest of the fetched bytes are loaded up towards slice $2^{NSUSE}-1$. The stml instruction loads memory positions from the boundary one greater than that of the destination EA with bytes from the register such that the byte at the EA in memory is filled with the byte at the least significant byte position of slice 0. The rest of the stored bytes are from byte locations in the source register up towards slice $2^{NSUSE}-1$.

BRIEF DESCRIPTION OF THE DRAWINGS

FIG. 6 is a diagram illustrating the operation of the ldml instruction; and

FIG. 7 is a diagram illustrating the operation of the stml instruction.

DETAILED DESCRIPTION OF THE PREFERRED EMBODIMENTS

Figure 1:
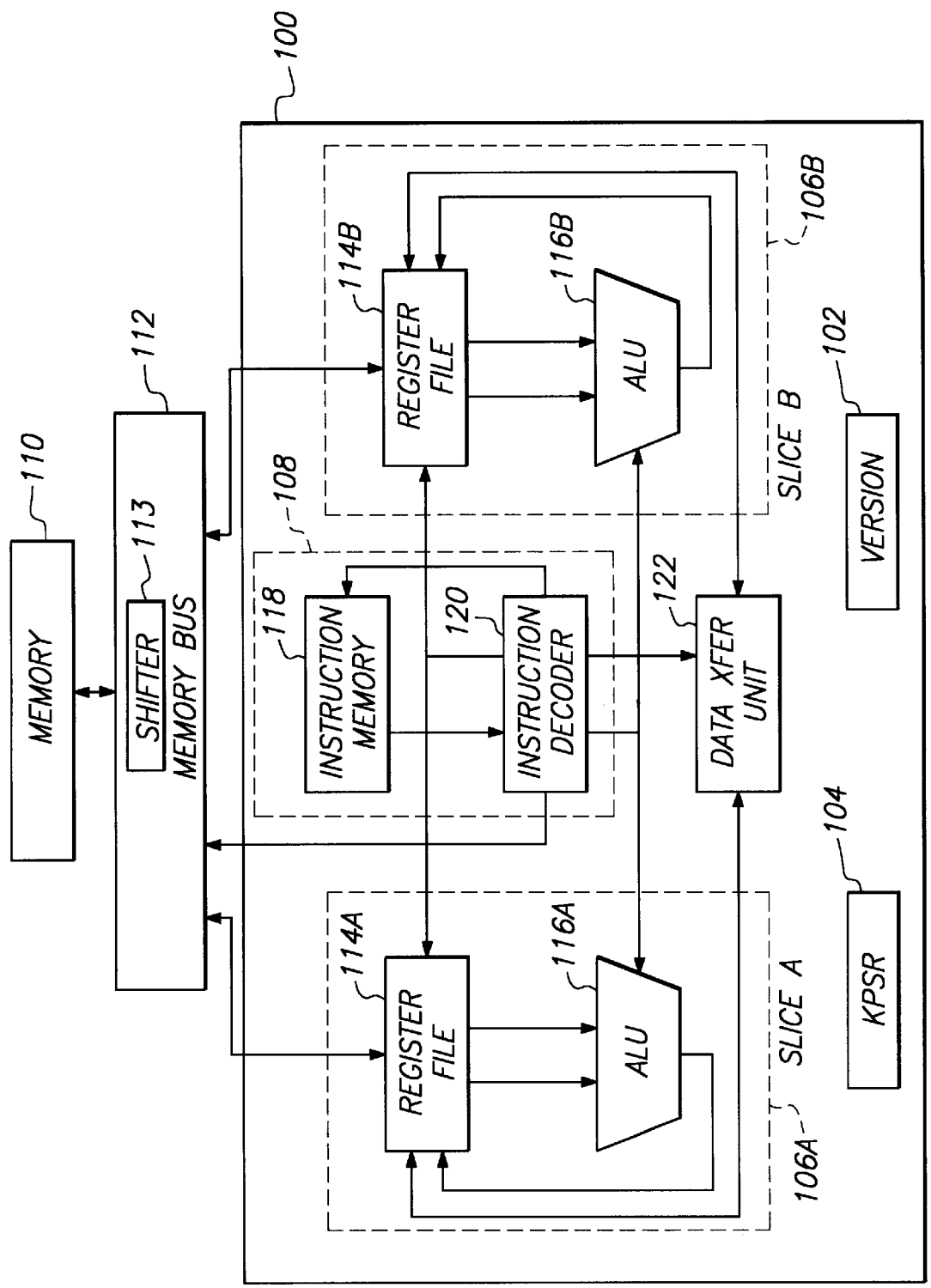
FIG. 1 is a high-level block diagram illustrating the functional units of a media operations processor having multiple datapath instances and related components.

FIG. 1 is a high-level block diagram illustrating the functional units of a sliceable media operations processor (SMOP) 100 having multiple datapath instances. The SMOP of FIG. 1 has two slices, labeled "A" and "B" 106, although embodiments of the SMOP can have a number of slices equal to any power of two. Shown are a version register 102 and a kernel processor status register (KPSR) 104, the slices 106, SMOP core logic 108, and a data transfer unit 122. In addition, a memory 110 is coupled to the SMOP 100 via a memory bus 112. Each slice 106 comprises a register file 114 and an arithmetic logic unit (ALU) 116 The core logic 108 comprises an instruction memory 118 and an instruction decoder 120.

A single slice of the SMOP preferably has a 32-bit datapath, or number of bits that can be transferred in parallel from the memory 110 to the slice. The SMOP 100 architecture can instantiate multiple slices each having a 32-bit datapath. Thus, the SMOP 100 can have $2^n$ slices, with each slice having a 32-bit datapath and the total processor datapath being $2^n*32$ bits. The first slice forms the least significant bits of the total datapath and all subsequent slices contribute to the most significant bits. As used herein, eight bits equal one byte, 2 bytes equal one word, and one double word equals 4 bytes.

The version register 102 is a hardwired read-only register containing a value indicating the maximum number of datapath slices available in the particular SMOP 100 implementation. The version register 102 can be read by a program instruction executing on the SMOP 100. In this manner, the program can determine at run time the amount of data-level parallelism that can be extracted from the particular SMOP. Then, for example, the program can appropriately fix the values of variables like loop counters to account for the amount of data parallelism. In this manner, code, such as computationally intensive inner loops of algorithms, can be written once and then run at maximum efficiency on different implementations of the SMOP 100 without modification.

The KPSR 104 is a writeable register holding a value indicating the number of slices in the SMOP 100 that are in use. A programmer can select the number of slices out of the total available slices $2^n$ that a program will use by storing an NSUSE, or number of slices used, value in the KPSR 104. In response, the SMOP 100 will use $2^{NSUSE}$ slices. Thus, if an algorithm is not amenable to very wide data vectors or if a code segment is fine tuned to a smaller slice implementation, the programmer can reduce the number of slices of the datapath that the program uses.

The register file 114 receives inputs from the instruction decoder 120, the ALU 116, and the data transfer unit 122, and has two outputs coupled to the ALU 116 and an output coupled to the data transfer unit 122. In addition, the register file 114 is bi-directionally coupled to the memory 110 via the memory bus 112. The SMOP 100 preferably has a single register file 114 of 32 registers. Each register preferably has a width of slice datapath * $2^n$ slices. If the embodiment of the SMOP in FIG. 1 has a 32-bit slice datapath, then each register is 64 bits wide. The register file 114 supports byte enable. That is, the register file receives and transmits control signals along with data indicating which bits of the data are active. Though the use of byte enable signals, the register file can send and receive data as wide as the entire SMOP 100 datapath while identifying only certain bytes that contain relevant data.

Each register within the file 114 is logically divided into $2^n$ equal-width slices. Thus, the separate register file blocks 114A, 114B illustrated in FIG. 1 are preferably logically divided from a single register file 114. Each of the logical register files has separate data and control paths as illustrated in FIG. 1 in order to support parallel operation as described herein. Moreover, the discussion below describes the operation of a single logical register file unless stated otherwise.

The register file 114 receives one or more indices selecting particular registers within the file 114 and associated control signals from the instruction decoder 120. In response, the register file 114 loads a value into the selected register from the memory 110 via the memory bus 112, loads a value from the ALU 116, stores a value to or loads a value from the data transfer unit 122, or presents the contents of two selected registers to the ALU 116.

In a preferred embodiment of the present invention, each slice 106 in the SMOP 100 has a separate ALU 116. Each ALU 116 receives two operands from the register file 114 within the respective slice and control signals from the instruction decoder 120. In addition, each ALU 116 has an output coupled to the register file 114 within the respective slice. Each ALU 116 performs an arithmetic logic operation on the operands received from the register file 114. The type of operation performed is specified by the control signals received from the instruction decoder 120. The result of the operation is presented at the output of the ALU 116 where it may be stored in the register file 114.

The instruction memory 118 within the core logic 108 receives an input from the instruction decoder 120 and has an output coupled to the instruction decoder 120. The instruction memory 118 holds program instructions for the program currently being executed by the SMOP 100. The input received from the instruction decoder 120 identifies a particular instruction within the memory 118. In response, the instruction memory 118 outputs the identified instruction.

The instruction decoder 120 has an input coupled to the instruction memory 118, and outputs coupled to the register file 114, the ALU 116, the instruction memory 118, and the data transfer unit 122. The instruction decoder 120 decodes instructions received from the instruction memory 118 and generates outputs and control signals in response thereto. The control signals destined for the slices 106 are replicated and sent to each slice enabled by the KPSR 104. The instructions supported by the instruction decoder 120 are described in more detail below.

The data transfer unit 122 is bi-directionally coupled to each register file 114 in the SMOP 100 implementation and receives control signals from the instruction decoder 120. The data transfer unit 122 operates, under the control of the instruction decoder 120, to transfer data among the register files 114 in different slices 106 of the SMOP 100. In general, the data transfer unit 122 reads data from a register in a first slice 106A and writes the data to a register in a second slice 106B or vice-versa This functionality is described in more detail below.

The memory 110 is preferably an addressable, monolithic memory that loads and stores data responsive to signals received via the bus 112. As with conventional memories, the memory 110 supports byte enable through control signals transmitted via the bus 112. Through byte enable, the SMOP 100 and memory 110 indicate to which slice or slices a data transfer pertains. When performing loads from memory, an alternative embodiment of the present invention loads the entire $2^{NSUSE}$ double words from the destination register within the file 114, multiplexes the loaded bytes from memory into the loaded data, and writes back the combined result to the register file 114. This embodiment may be preferred in a pipelined implementation of the SMOP 100 as it eases data forwarding in the case of data dependencies.

The memory bus 112 transmits data and control signals between the SMOP 100 and the memory 112 and supports byte enable from both the register file 114 and the memory 110. Within the memory bus 112 is a shift register 113 operating at the byte level of granularity for moving bytes being loaded or stored into the proper positions. In addition, the memory bus 112 updates the byte enable signals to reflect the new shifted positions of the bytes. Shifts performed by the shift register 113 are apparent from the descriptions of the instructions for loading and storing described below. In addition, the shift register 113 and other functionality described as within the memory bus 112 may be located in the SMOP 100 or at the memory 114 rather than within the bus 112.

The instruction set implemented by the SMOP 100 exploits data parallelism by supporting single-instruction-multiple-data (SIMD) operations. Thus, each slice can be used in a SIMD manner by packing two or four 2-byte words into the slice datapath. The SMOP 100 supports four instructions for transferring data between the slices. The shlslice instruction moves the contents of the register in slice i to the register in slice i+1. Similarly, the shrslice instruction moves the contents of the register in slice i to the register in slice i−1. The shlm instruction moves a variable amount of up to 31 bits of the contents from the register in slice i to the register in slice i+1. The shrm instruction moves a variable amount of up to 31 bits of the contents of the register in slice i to the register in slice i−1. Each of these instructions is performed by transferring the contents of the selected register in the first slice to the data transfer unit 122 and then storing the manipulated register contents in the corresponding register in the second slice.

The DTU 122 performs the instructions discussed above by essentially acting as a shift register. The DTU 122 takes as input a concatenated $2^{NSUSE} * 32$-bit wide value from the selected register segments within the active slices. Then, the DTU 122 shifts the data in the specified direction and by the specified amount. For a shlm or a shrm instruction, the DTU 122 shifts the data by a variable amount from zero to 31 bits. For a shlslice or a shrslice instruction, the DTU 122 shifts the data by 32 bits. The DTU 122 partitions the resulting data into 32-bit chunks which are then sent to the appropriate slices.

The SMOP 100 also supports instructions for fetching data from and storing data to memory 114. Two instructions, load multiple (ldm) and store multiple (stm), are used to respectively fetch data from and store data to an address on an NSUSE double word (dword), or 32-bit, boundary. Other instructions, including load multiple high (ldmh), load multiple low (ldml), store multiple high (stmh), and store multiple low (stml), are used to respectively fetch data from and store data to a misaligned address not on an NSUSE dword aligned boundary.

The ldm instruction has the format ldm source, destination, where source specifies a 32-bit effective address (EA) in memory 110 and destination specifies a register in the register file 114. The ldm instruction fetches $2^{NSUSE}$ dwords from the source and stores the dwords in the destination. The stm instruction has the same format, except that source specifies a register and destination specifies a 32-bit EA in memory. The stm instruction stores $2^{NSUSE}$ dwords from the source to the destination. In both ldm and stm, the EA must be aligned on a $2^{NSUSE} *$ four-byte (32-bit) boundary.

Figure 2:
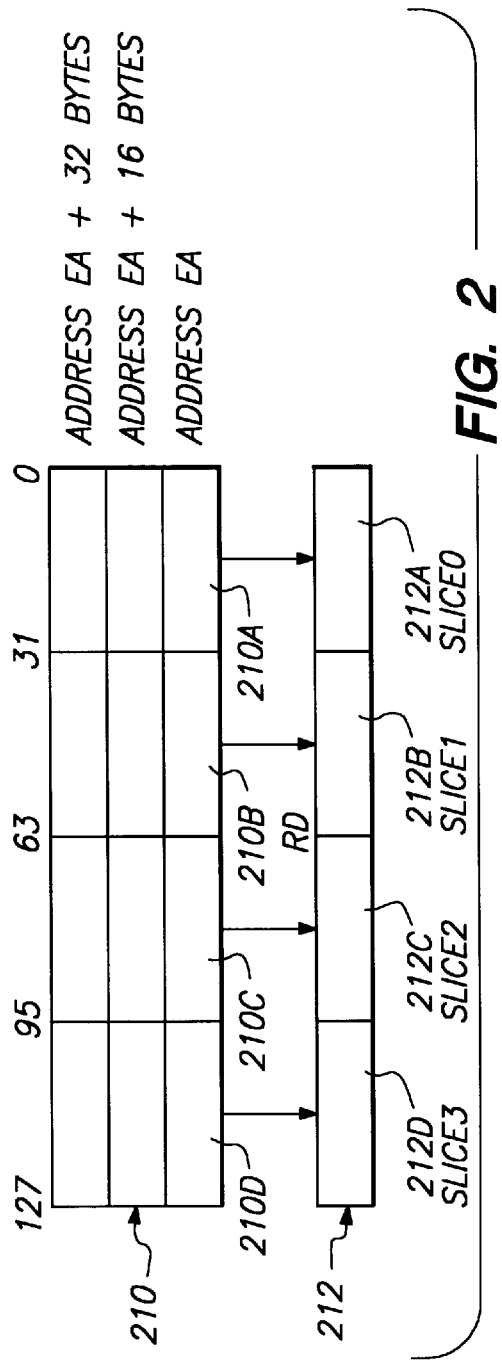
FIG. 2 is a diagram illustrating the operation of the ldm instruction.

FIG. 2 is a diagram illustrating the operation of the ldm instruction when NSUSE=2. Shown are a memory 210, such as memory 110, and a register 212. The memory 210 is aligned along $2^{NSUSE} *$ 4-byte (32-bit) boundaries, thereby dividing each line of the memory 210 into four 32-bit dwords 210A–D. The register is divided into four 32-bit slices 212A–D. When the SMOP 100 executes the ldm instruction, the four 32-bit dwords beginning at the source EA 210 are loaded into the corresponding slices of the register 212.

Figure 3:
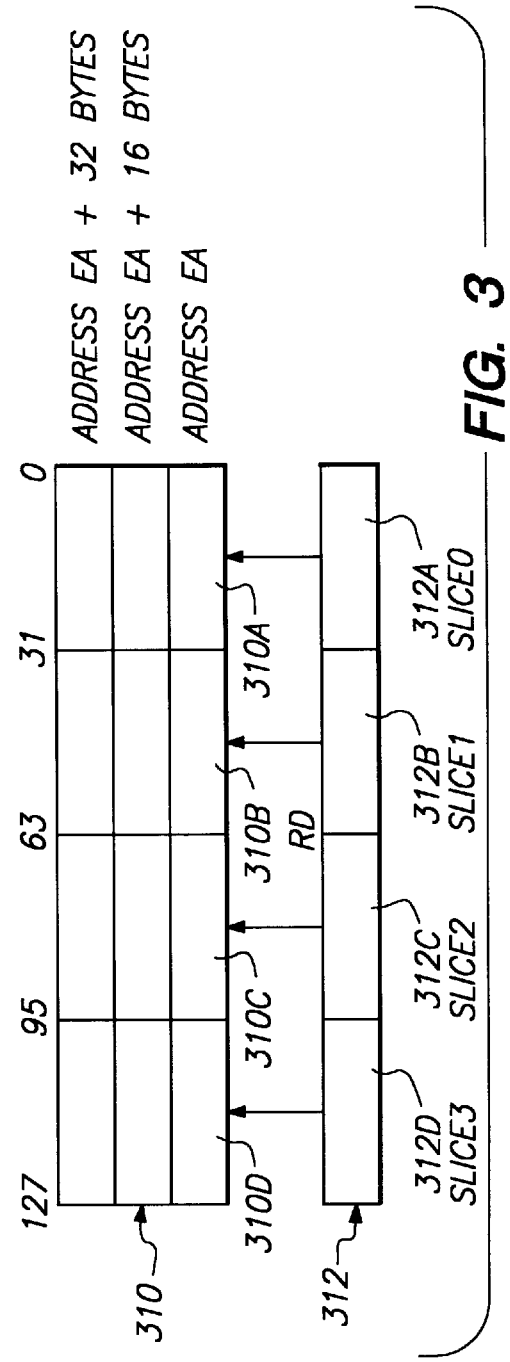
FIG. 3 is a diagram illustrating the operation of the stm instruction.

FIG. 3 is a diagram illustrating the operation of the stm instruction when NSUSE=2. Shown are a memory 310, such as memory 110, and a register 312. The memory 310 is aligned along 32-bit boundaries, thereby dividing each line of the memory 310 into four 32-bit dwords 310A–D. The register is divided into four 32-bit slices 312A–D. When the SMOP 100 executes the stm instruction, the four 32-bit dwords in the source register are stored to the respective positions in the memory 310 starting at the specified destination EA.

The ldmh instruction has the format ldmh source, destination, where source specifies a 32-bit EA in memory and destination specifies a register. The ldmh instruction fetches all bytes from the $2^{NSUSE}$ * 4-byte boundary one less than that of the EA to the EA from memory and loads the bytes in the destination register such that the byte at the EA is at the most significant byte position of slice $2^{NSUSE}-1$. The rest of the fetched bytes are loaded down towards slice 0.

Figure 4:
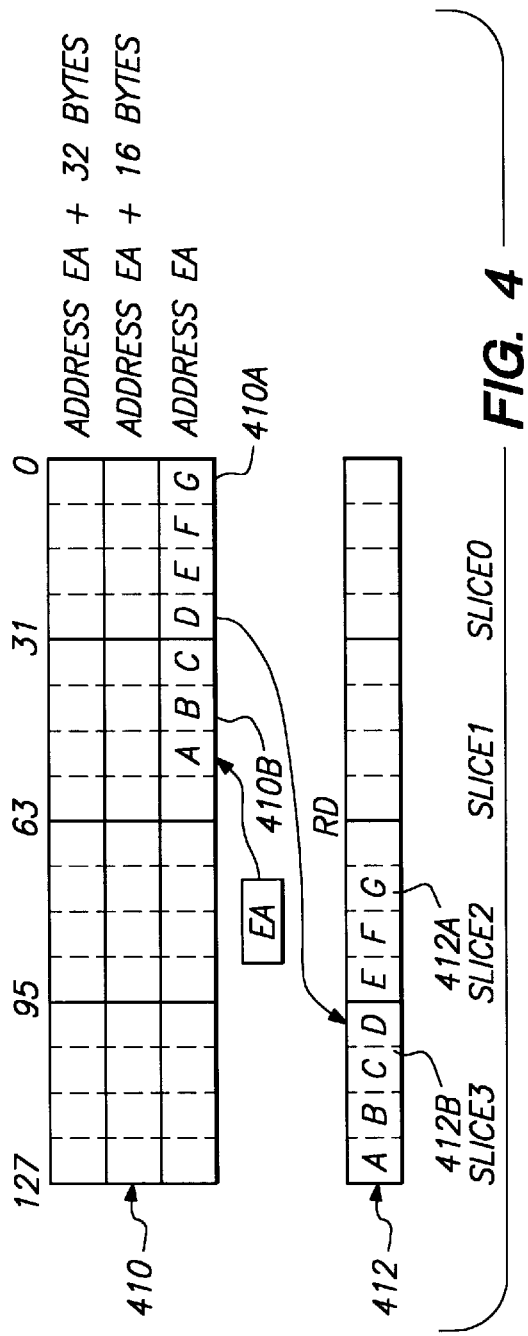
FIG. 4 is a diagram illustrating the operation of the ldmh instruction.

FIG. 4 is a diagram illustrating the operation of the ldmh instruction when NSUSE=2. Shown are a memory 410, such as memory 110, and a register 412. The memory 410 is aligned along $2^{NSUSE}$ * 4-byte (32-bit) boundaries, thereby dividing each line of the memory 410 into four 32-bit dwords 410A–B. The register is divided into four slices 412A–B of 32 bits each. When the SMOP 100 executes the ldmh instruction, the bytes of memory 410 from the EA down to the next lower NSUSE dword aligned boundary 410A are stored to the register 412 from the most significant byte downward. As shown in FIG. 4, the bytes starting at the EA in dword 410B are placed in slice 3 412B of the register 412. The bytes in the next lower dword are stored in slice 2 412A.

Similarly, the stmh instruction has the format stmh source, destination, where source specifies a register and destination specifies a 32-bit EA in memory. The stmh instruction loads memory positions from the $2^{NSUSE}$ * 4-byte boundary one less than that of the destination EA with bytes from the source register such that the byte at the destination EA is filled with the byte at the most significant byte position of slice $2^{NSUSE}-1$.

Figure 5:
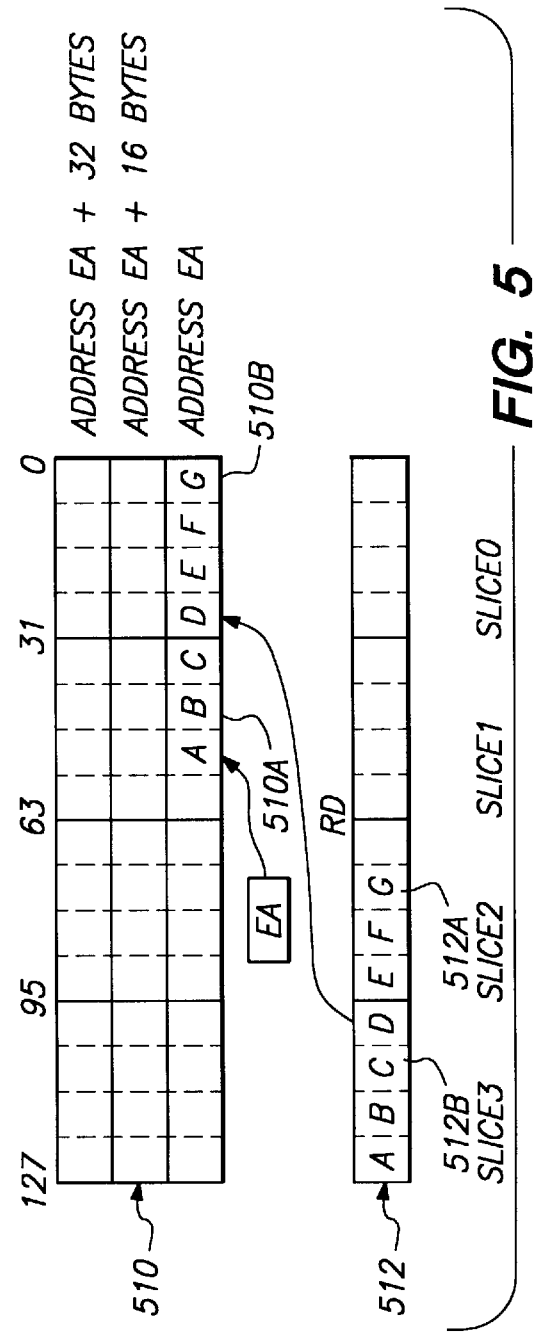
FIG. 5 is a diagram illustrating the operation of the stmh instruction.

FIG. 5 is a diagram illustrating the operation of the stmh instruction when NSUSE=2. Shown are a memory 510, such as memory 110, and a register 512. The memory 510 is aligned along $2^{NSUSE}$ * 4-byte (32-bit) boundaries, thereby dividing each line of the memory 510 into four 32-bit dwords. The register is divided into four 32-bit slices. When the SMOP 100 executes the stmh instruction, data are stored to the destination EA in the memory 510 down to the next lower NSUSE dword aligned boundary from the appropriate number of higher order bytes in the source register. As shown in FIG. 5, the EA points to a location in dword 510B. Accordingly, the dwords 510B and 510A are filled with bytes from slice 3 512B and slice 2 512A.

The ldml instruction has the format ldml source, destination, where source specifies a 32-bit EA in memory and destination specifies a register. The ldml instruction fetches all bytes from the $2^{NSUSE}$ * 4-byte boundary one greater than that of the EA to the EA from memory and loads the bytes in the destination register such that the byte at the EA is at the least significant byte position of slice 0. The rest of the fetched bytes are loaded up towards slice $2^{NSUSE}-1$.

FIG. 6 is a diagram illustrating the operation of the ldml instruction when NSUSE=2. Shown are a memory 610, such as memory 110, and a register 612. The memory 610 is aligned along $2^{NSUSE}$ * 4-byte (32-bit) boundaries, thereby dividing each line of the memory 610 into four 32-bit dwords. The register is divided into four 32-bit slices. When the SMOP 100 executes the ldml instruction, the bytes of memory 610 from the EA up to the next higher NSUSE dword aligned boundary 612B are stored to the register 612 from the least significant byte upward. As shown in FIG. 6, the bytes starting at the EA in dword 610A are placed in slice 0 612A of the register 612. The bytes in the next higher dword 610B are stored in slice 2 612A.

Similarly, the stml instruction has the format stml source, destination, where source specifies a register and destination specifies 32-bit EA in memory. The stml instruction loads memory positions from the $2^{NSUSE}$ * 4-byte boundary one greater than that of the destination EA with bytes from the source register such that the byte at the EA in memory is filled with the byte at the least significant byte position of slice 0. The rest of the stored bytes are from byte locations in the source register up towards slice $2^{NSUSE}-1$.

FIG. 7 is a diagram illustrating the operation of the stml instruction when NSUSE=2. Shown are a memory 710, such as memory 110, and a register 712. The memory 710 is aligned along $2^{NSUSE}$ * 4-byte (32-bit) boundaries, thereby dividing each line of the memory 710 into four 32-bit dwords. The register is divided into four 32-bit slices. When the SMOP 100 executes the stml instruction, data are stored to the destination EA in the memory 510 up to the next higher NSUSE dword aligned boundary 710B from the appropriate number of higher bytes in the source register 712. As shown in FIG. 7, the EA points to a location in dword 710A. Accordingly, the dwords 710A and 710B are filled with bytes from slice 0 712A and slice 1 712B.

The instructions illustrated by FIGS. 2–7 are preferably performed using the byte enable signals and shift register 113 described above with respect to FIG. 1. For the ldm and stm instructions, the byte enable signals select all of the bytes in the active slices. For the ldmh, stmh, ldml, and stml instructions, the enabled bytes are sent to the shift register 113, shifted to the appropriate positions, and then sent to the destination.

In sum, the SMOP architecture is a relatively low complexity design tuned to exploit data parallelism while maintaining a simple programming model. Instructions executing on the SMOP 100 utilize data parallelism without necessarily considering the number of slices available or active.

What is claimed is:

1. A processor having a datapath width for processing data received from a memory, the processor comprising:

an instruction decoder for decoding an instruction and generating control signals therefrom;

a plurality of datapath instances, each having a datapath width less than the processor datapath width and coupled to the instruction decoder and the memory, for retrieving data from, storing data to, and operating on data from the memory responsive to control signals received from the instruction decoder;

a data transfer unit coupled to the plurality of datapath instances and the instruction decoder for transferring data among the plurality of datapath instances responsive to control signals received from the instruction decoder; and a register readable by an instruction decoded by the instruction decoder for indicating how many datapath instances are in the processor.

2. The processor of claim 1, wherein each of the plurality of datapath instances comprises:

a plurality of registers each having a datapath as wide as the datapath instance for holding data; and an arithmetic logic unit coupled to the plurality of registers for performing arithmetic logic operations on data received from the registers.

3. The processor of claim 2, further comprising:
a plurality of registers, each having a datapath as wide as the processor datapath and coupled to the plurality of datapath instances, the arithmetic logic unit, and the instruction decoder;
wherein the plurality of registers having datapaths as wide as the datapath instance are logically divided segments of the plurality of registers having datapaths as wide as the processor datapath.

4. The processor of claim 1, further comprising:
a register accessible by the instruction decoder for indicating which of the plurality of datapath instances are active;
wherein the control signals generated by the instruction decoder are replicated for each of the active datapath instances.

5. The processor of claim 1, wherein the data transfer unit comprises:
a logical shift register for shifting data received from ones of the plurality of datapath instances by a variable amount responsive to the control signals received from the instruction decoder.

6. The processor of claim 5, wherein a maximum number of positions by which the shift register can shift the data is determined by the datapath width of the plurality of datapath instances.

7. The processor of claim 1, further comprising:
a shift register having a byte granularity disposed between the plurality of datapath instances and the memory for shifting transferred data among the plurality of datapath instances.

8. The processor of claim 1, wherein the memory has logical boundaries indicating datapath widths and wherein the instruction decoder is adapted to decode an instruction set comprising:
a first instruction for loading data stored between an address in the memory and a first logical boundary of the memory into one or more of the datapath instances, wherein the data at the address in the memory is stored at a selected position in one of the datapath instances; and
a second instruction for storing data from one or more of the plurality of datapath instances to the memory, wherein the data from the one or more datapath instances is stored between a selected address in the memory and a second logical boundary in the memory.

9. The processor of claim 8, wherein the first logical boundary is at an address greater than the address in the memory.

10. The processor of claim 8, wherein the first logical boundary is at an address less than the address in the memory.

11. A processor having a total datapath width for performing media operations on data retrieved from a memory, the processor comprising:
at least one datapath instance having a datapath width less than the total datapath width for operating on the data retrieved from the memory;
a plurality of register instances, each having a width equal to the datapath instance width and formed from a portion of a corresponding register of a plurality of registers each having a width equal to the total datapath width, coupled to the at least one datapath instance, for holding the data;
an instruction decoder coupled to the at least one datapath instance for decoding an instruction and generating control signals therefrom for manipulating the data held in the plurality of register instances, wherein the control signals are replicated and transmitted to each datapath instance in the processor; and
a register for indicating a number of datapath instances within the processor.

12. The processor of claim 11, further comprising:
a register for indicating a number of datapath instances in use by the processor, wherein the control signals are replicated and transmitted to only the datapath instances that are in use.

13. The processor of claim 11, wherein the processor further comprises:
an arithmetic logic unit coupled to the at least one datapath instance for performing arithmetic operations on data received from the plurality of register instances.

14. The processor of claim 11, wherein there are a plurality of datapath instances and the processor further comprises:
a data transfer unit receiving control signals from the instruction decoder and coupled to the plurality of datapath instances for transferring data among the plurality of datapath instances responsive to the received control signals.

15. The processor of claim 11, wherein the memory has logical datapath boundaries, and wherein the instruction decoder is adapted to decode an instruction set comprising:
a first instruction for loading data stored between an address in the memory and a logical datapath boundary of the memory into one of the plurality of registers, wherein the data at the address in the memory is stored at a selected position in the register; and
a second instruction for storing data from one of the plurality of registers to the memory, wherein the data from the register is stored between a selected address in the memory and a logical datapath boundary in the memory.

16. The processor of claim 15, wherein the selected position in the register is the least significant position.

17. The processor of claim 15, wherein the selected position in the register is the most significant position.

18. A processor having a datapath divided into one or more datapath instances and a plurality of registers, wherein each register is as wide as the datapath and is logically divided into the one or more datapath instances, the processor for coupling to an addressable memory and executing a processor instruction set comprising:
instructions for moving data among the datapath instances within a selected one of the plurality of registers;
instructions for moving data between one or more datapath instances of a selected one of the plurality of registers and an address in the memory; and
an instruction for determining a number of datapath instances available in the processor.

19. The processor of claim 18, wherein the instructions for moving data among the datapath instances within a selected one of the plurality of registers comprise:
an instruction for moving all data in a first datapath instance to a second datapath instance; and
an instruction for moving a variable amount of data in the first datapath instance to the second datapath instance.

20. The processor of claim 18, wherein the instructions for moving data between one or more datapath instances of a selected one of the plurality of registers comprise:
an instruction for loading data to a plurality of datapaths of the selected register from the address in the memory; and an instruction for storing data from a plurality of datapaths of the selected register to the address in the memory.

21. The processor of claim 20, wherein the address in the memory is aligned on a datapath instance boundary.

22. The processor of claim 20, wherein the address in the memory is not aligned on a datapath instance boundary.

23. The processor of claim 18, wherein the processor instruction set further comprises:

an instruction for selecting a number of datapath instances used by other instructions.

* * * * *